United States Patent
Parsons et al.

(10) Patent No.: US 7,031,811 B2
(45) Date of Patent: Apr. 18, 2006

(54) FUEL EFFICIENT AIRSPEED TRIM

(75) Inventors: Keith D. Parsons, Renton, WA (US); Roger M. Edmark, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 81 days.

(21) Appl. No.: 10/452,039

(22) Filed: May 30, 2003

(65) Prior Publication Data

US 2004/0254693 A1 Dec. 16, 2004

(51) Int. Cl.
  *B64C 13/00* (2006.01)
  *B64C 13/18* (2006.01)
  *G06G 1/02* (2006.01)

(52) U.S. Cl. .............................. 701/7; 701/11; 244/181

(58) Field of Classification Search .................... 701/7, 701/3, 11, 121; 244/181, 182, 178, 177, 244/17.13
See application file for complete search history.

(56) References Cited

U.S. PATENT DOCUMENTS

| | | | | |
|---|---|---|---|---|
| 3,533,579 A | * | 10/1970 | Moller | 244/182 |
| 3,621,941 A | * | 11/1971 | Blout | 188/52 |
| 3,949,958 A | * | 4/1976 | Richter | 244/227 |
| 4,346,288 A | * | 8/1982 | Foster | 235/70 A |
| 4,382,283 A | * | 5/1983 | Clelford et al. | 701/11 |
| 4,641,268 A | * | 2/1987 | Zweifel et al. | 701/121 |
| 4,764,872 A | * | 8/1988 | Miller | 701/3 |
| 5,407,153 A | * | 4/1995 | Kirk et al. | 244/199 |

* cited by examiner

*Primary Examiner*—Thomas G. Black
*Assistant Examiner*—Dalena Tran
(74) *Attorney, Agent, or Firm*—Black Lowe & Graham, PLLC

(57) ABSTRACT

A system and method are provided for precisely adjusting individual aircraft airspeed system in order to provide more accurate cruise Indicated Airspeed (IAS). The system includes a flight data computer, an autopilot, and airspeed displays. The flight data computer includes a first component that records in-service data to determine actual fuel mileage for the aircraft for comparison to a production rating fuel mileage. The flight data computer also includes a user interface that allows a user to set a Mach trim value based on the comparison and a third component that adjusts indicated airspeed based on the determined Mach trim value. The autopilot and airspeed displays receive the adjusted indicated airspeed.

32 Claims, 3 Drawing Sheets

FUEL EFFICIENT AIRSPEED TRIM

FIELD OF THE INVENTION

This invention relates generally to aircraft performance and, more specifically, to aircraft airspeed generation.

BACKGROUND OF THE INVENTION

Indicated Airspeed (IAS) of an aircraft is determined by an airspeed system of the aircraft and is typically an input into flight performance management systems. Analysis of fuel mileage data has indicated that many aircraft are actually flying slightly faster than the (IAS) due to normal variations of typical production airspeed systems.

When an aircraft is flying faster than optimum cruise IAS, the rapid increase in airframe drag must be overcome by additional engine thrust and hence higher fuel burn. A small negative bias in IAS will cause the autopilot to fly the aircraft slightly faster than expected. The resulting fuel mileage calculation will indicate an excessive deviation due to a real effect of burning excess fuel to overcome excess drag and a false perception caused by comparing to production rated fuel mileage at slower than actual airspeed. The false perception of high fuel burn may be a significant economic factor because actual—vs—predicted fuel burn is routinely used as a feedback mechanism to adjust mission fuel predictions for individual aircraft. If such an airplane were gross weight limited on a particular route then revenue payload must be reduced to offset the weight of excess fuel.

For example, a cruise speed bias of only two or three miles per hour on a large commercial aircraft may inadvertently waste more than one hundred thousand gallons of fuel per year. Since both real and perceived effects are similar in size, the resulting increase in airplane takeoff weight due to the bias in mission planning could be double the amount needed to offset excess fuel burn during cruise. Over the course of a year the accumulation of unrealized airplane performance could exceed more than one million pounds per airplane. The combined impact of higher fuel expenses and potentially lower payload revenue could be considerable for operators with a large fleet of airplanes Previous attempts to solve this recurring problem have focused on eliminating airspeed biases by performing a one-time change to airspeed calibration for an entire fleet of aircraft. However, these attempts do not take into consideration variations that occur from one aircraft to the next.

Therefore, there is an unmet need in the art for an ability to precisely adjust each aircraft's airspeed system in order to provide more accurate cruise IAS, thereby providing more optimum fuel efficiency.

SUMMARY OF THE INVENTION

The present invention provides a system and method for accurately adjusting each aircraft's airspeed system in order to provide more accurate cruise Indicated Airspeed (IAS) and optimize aircraft operating economics. Using the present invention, airlines can fine-tune the IAS on individual airplanes to remove normal variations inherent in each aircraft's production airspeed system. Advantageously, many certification related aspects are avoided because the trim is phased out for airspeeds above or below a Mach range that defines optimum cruise.

An embodiment of the system includes a flight data computer, a pilot or autopilot, and airspeed displays. The flight data computer includes a first component that records in-service data to determine actual fuel mileage for the aircraft for comparison to a production rating fuel mileage. The flight data computer also includes a user interface that allows a user to set a Mach trim value based on the comparison and a third component that adjusts indicated airspeed based on the determined Mach trim value. The autopilot and airspeed displays receive the adjusted IAS.

In one aspect of the invention, the first component records fuel mileage data to determine actual fuel mileage over a range of speeds.

In another aspect of the invention, the third component adjusts the IAS if the IAS is within a range of cruise airspeeds.

BRIEF DESCRIPTION OF THE DRAWINGS

The preferred and alternative embodiments of the present invention are described in detail below with reference to the following drawings.

DETAILED DESCRIPTION OF THE INVENTION

The present invention is a system and method for adjusting aircraft Indicated Airspeed (IAS) to a more accurate value bias by recognizing that fuel mileage has an inverted parabolic shape characteristic when plotted as a function of Mach. In-service fuel mileage data would be expected to drift downward over time, reflecting the normal fuel mileage deviation due to engine deterioration. The magnitude of the deviation for engine wear should be relatively constant regardless of the cruise Mach for a given data point. In other words the fuel mileage deviation for a large sample of data points from any given airplane should not produce a noticeable slope when plotted as a function of Mach.

A speed bias may be easily mistaken for normal engine deterioration if individual data points are simply averaged together. If one considers that fuel mileage produces the shape of an upside down letter "U" when plotted as a function of Mach, and most all of cruise occurs near the speed that correlates with the peak fuel mileage, or slightly faster, it can be seen that the comparison of in-service fuel mileage with a reference production rated fuel mileage will produce a sloped deviation if both shapes are not centered relative to each other.

The left-to-right position of production rated fuel mileage versus Mach is correct by definition because it is the basis for all on-board autopilot calculations for "best speed to fly". The autopilot receives feedback through the production airspeed system and continuously adjusts engine power to maintain the "best speed to fly". A bias in the production airspeed system will manifest itself as a lateral shift for in-service fuel mileage and is a key characteristic that allows the user to analytically infer both size and magnitude of a speed bias. The present invention provides a system for implementing a software trim to fine tune the airspeed system on individual aircraft to eliminate unforeseen economic hardships caused by speed bias.

Figure 1:
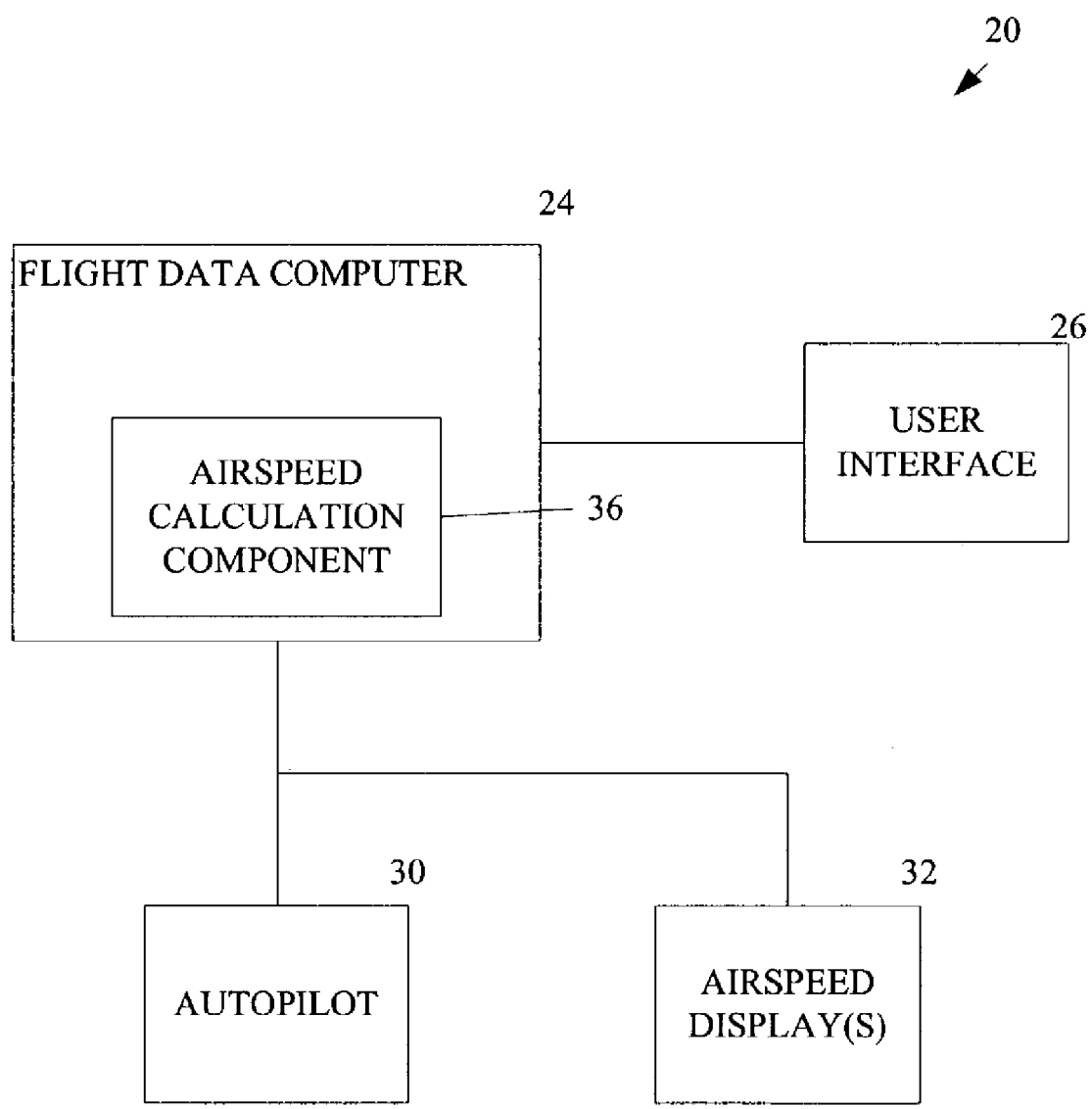
FIG. 1 illustrates a block diagram of a system for performing the method of the present invention.

FIG. 1 illustrates an example system 20 for implementing a method for adjusting speed according to the present invention. The system 20 includes a flight data computer 24 that is coupled to a user interface 26 and coupled to one of an autopilot 30 or one or more airspeed displays 32. The flight data computer 24 includes an airspeed calculation component 36 that is suitably implemented as software within memory of the flight data computer 24. The flight data computer 24, autopilot 30, and airspeed displays 32 are located on an aircraft (not shown). The user interface 26 can be located on the aircraft or can be a portable device that is brought on board the aircraft when necessary.

The airspeed calculation component 36 generates an aircraft indicated airspeed (IAS) or Mach number based on information received from airspeed measurement components, such as without limitation a pitot static system (not shown). The IAS produced by the airspeed calculation component 36 is sent to one or more of the autopilot 30 or airspeed displays 32. The airspeed displays 32 include cockpit displays, such as without limitation a heads up display, or navigational displays. During a predefined period of aircraft operation, multiple aircraft IAS and corresponding fuel mileage data is stored by the flight data computer 24. In one embodiment, a user determines the optimum Mach trim based on the stored IAS and corresponding fuel mileage data and predefined production rated fuel mileage. The determined Mach trim is provided to the airspeed calculation component 36. The airspeed calculation component 36 calculates a more accurate IAS value based on the provided Mach trim. Thus, the airspeed calculation component 36 generates a more accurate Mach number for use by the autopilot 30 and airspeed displays 32.

Figure 2:
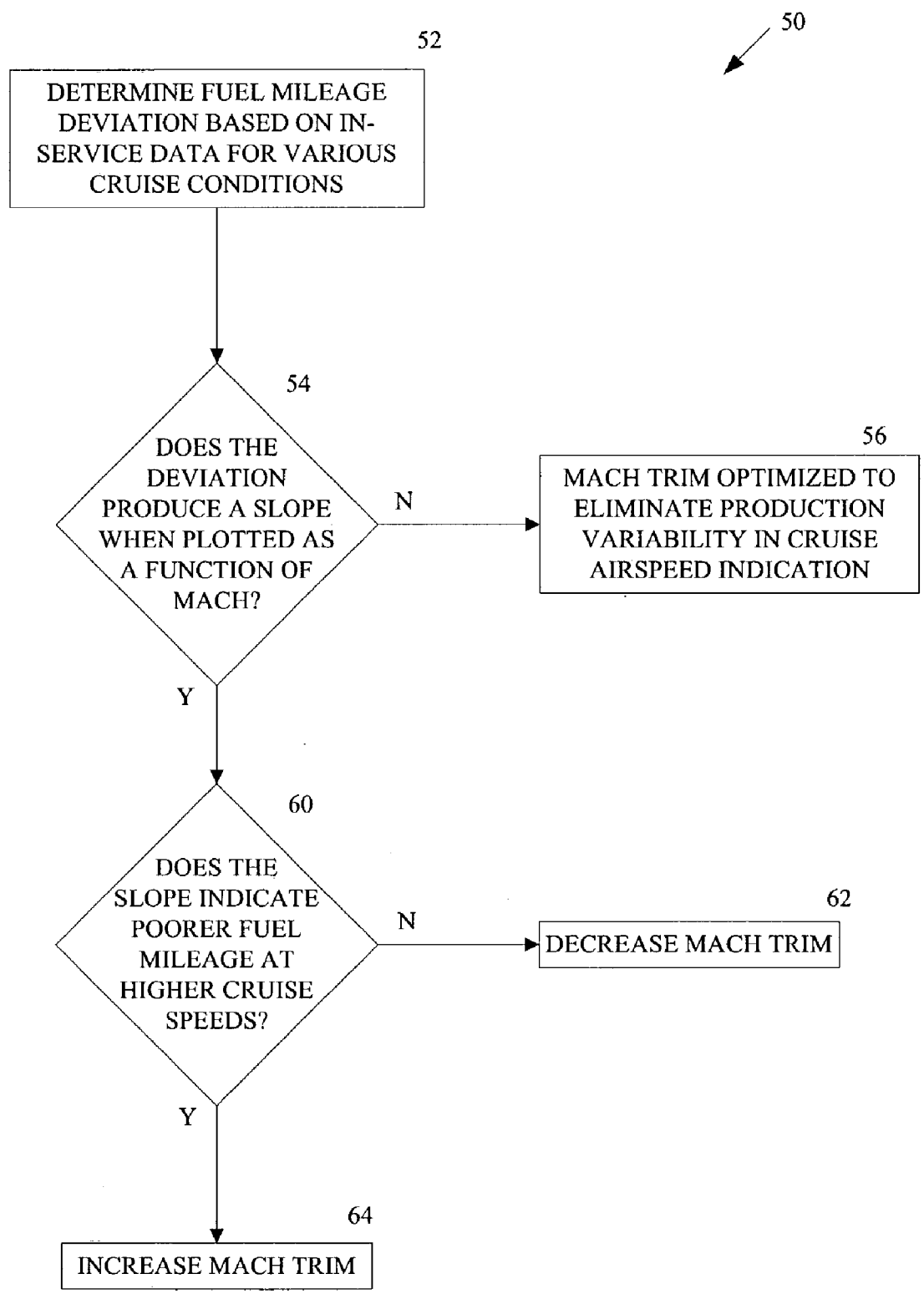
FIG. 2 illustrates a flow diagram for determining an Indicated Air Speed or Mach Speed trim value for an aircraft.

FIG. 2 illustrates a non-limiting example process 50 for determining Mach trim based on comparing aircraft performance information to production rated fuel mileage. The production rated fuel mileage is typically the same reference level for an entire fleet of similar type and model aircraft, such as without limitation the Boeing 747-400. Aircraft operators routinely compare in-service fuel mileage data to the production rated level to monitor normal engine deterioration over time. This allows the operator to manage airplane fuel loads to compensate for the slow but inevitable loss in engine performance. The present invention uses the same airplane condition monitoring information to detect and determine both the size and magnitude of aircraft IAS speed bias. First, at a block 52, the routine determination of the deviation between actual fuel mileage and predefined production rated fuel mileage is made for multiple IASs (or Mach numbers). At a decision block 54, the groupings of fuel mileage deviations are viewed as a function of IAS or Mach. An airspeed bias would be evident as a slope in the viewed date, where increasingly poor fuel mileage with increasing airspeed would indicate the airplane has been flying faster than indicated and vice versa. If the deviation does not produce a slope at the decision block 54, a Mach trim is optimized to eliminate production variability in cruise airspeed indication, see block 56. If the deviation does produce a slope at the decision block 54, a determination if the slope indicates poorer fuel mileage at higher cruise speeds is made, see decision block 60. If the slope does not indicate poorer fuel mileage at higher cruise speeds, Mach trim is decreased, block 62. If the slope indicates poorer fuel mileage at higher cruise speeds, Mach trim is increased, block 64. Various degrees of Mach trim should be evaluated to determine the level that best eliminates the slope such that the same general offset occurs for all cruise speeds. It is appreciated that once the proper Mach trim has been determined for a given airplane, overall fuel mileage may still deviate from the production rating due to other factors such as the normal degradation in engine fuel efficiency over time.

Figure 3:
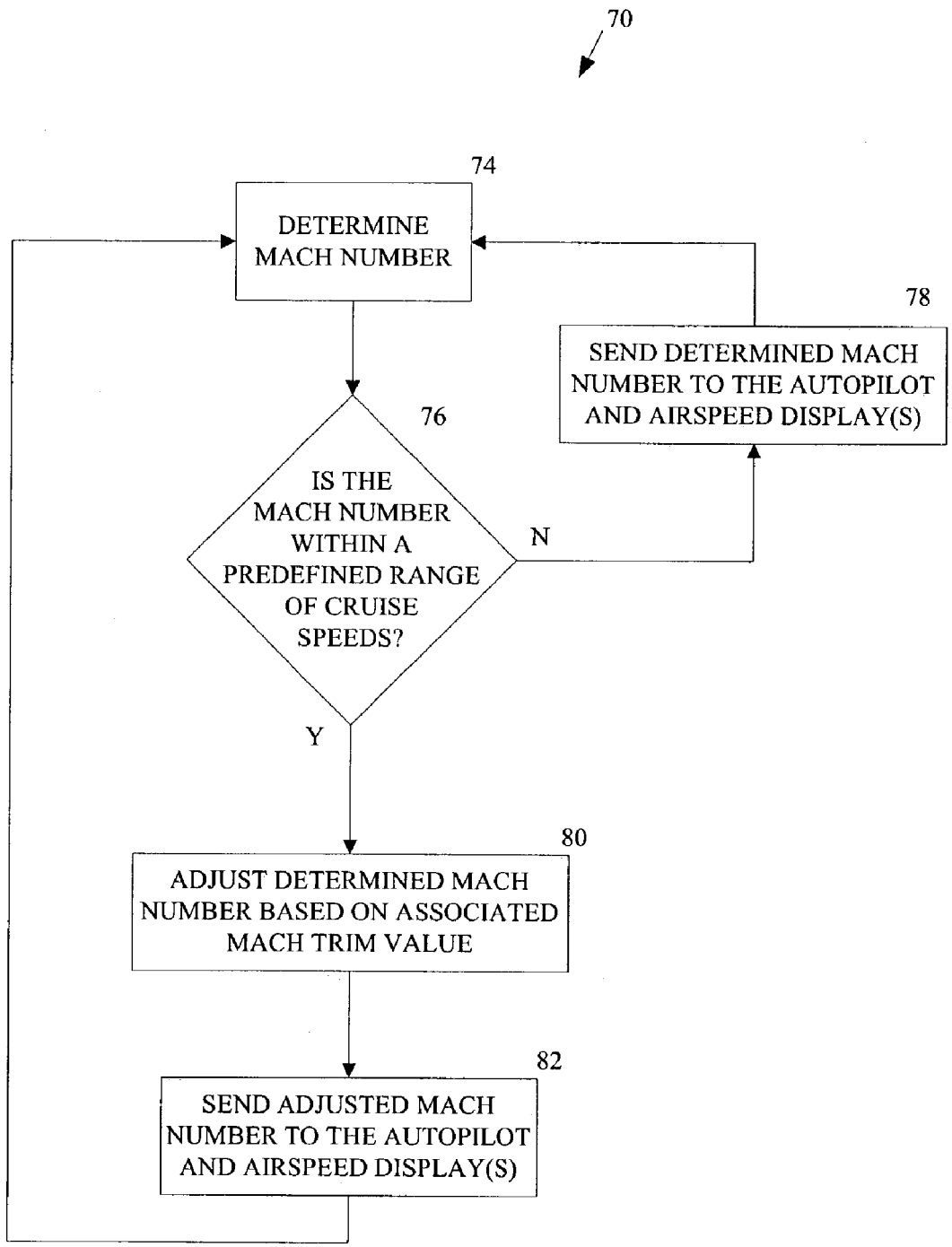
FIG. 3 is a flow diagram illustrating a process for using the determined trim value from the process of FIG. 2 during aircraft operation.

FIG. 3 illustrates a non-limiting example process 70 for implementing the Mach trim values determined by the process 50 of FIG. 2. First, at a block 74, a first Mach number (i.e., IAS) is determined by the airspeed calculation component 36 based on airspeed data received from other systems. At a decision block 76, the airspeed calculation component 36 determines if the calculated Mach number is within a predefined range of speeds. In another embodiment, another component within the flight data computer 24 or a component located between the flight data computer 24 and the autopilot 30 or the airspeed displays 32 can determine if the calculated Mach number is within a predefined range of speeds. The predefined range of speeds preferably does not include any critical airframe limit speeds, such as $V_{mo}$ and $V_{stall}$. If the determined Mach number is not within the predefined range of cruise speeds, then, at a block 78, the determined Mach number is sent to the autopilot 30 and airspeed displays 32. If the determined Mach number is within the predefined range of cruise speeds, then, at block 80, the determined Mach number is adjusted by the previously determined Mach trim value that is associated with the determined Mach number. At a block 82, the adjusted Mach number is sent to the autopilot 30 and airspeeds displays 32. After the steps in the blocks 78 and 82 are performed, the process 70 returns to the block 74.

In one embodiment, the magnitude of Mach trim needed for a given aircraft is determined by comparing fuel mileage measurements obtained over a range of airspeeds to a standard flight planning database, such as that already provided by The Boeing Company.

In one non-limiting example, the authority of the cruise Mach trim for a Boeing 777 aircraft is limited at +/−0.005 Mach number (Mn). This represents the largest adjustment that can be added to or subtracted from indicated airspeed. The authority for the cruise Mach trim is further restricted to when the airspeed is in the following range 0.82–0.86 Mn. This provides an adjustment of up to about +/−4 mph at a cruise speed of 560 mph. The Mach trim is purposely phased out for speeds above and below the range of authority to avoid interference with the certified limitation speeds for the aircraft.

While the preferred embodiment of the invention has been illustrated and described as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for adjusting indicated airspeed of an aircraft, the method comprising:
    determining a Mach trim value based upon a comparison of an actual fuel mileage value of the aircraft and a predetermined production rating fuel mileage; and
    automatically adjusting a predetermined indicated airspeed based on the determined Mach trim value.

2. The method of claim 1, further comprising:
    sending the adjusted indicated airspeed to at least one of an autopilot system or one or more airspeed displays.

3. The method of claim 1, wherein adjusting indicated airspeed adjusts the indicated airspeed if the indicated airspeed is within a range of airspeeds.

4. The method of claim 3, wherein the range of airspeeds includes cruise airspeeds.

5. A system for adjusting indicated airspeed of an aircraft, the system comprising:
   means for determining a Mach trim value based upon a comparison of an actual fuel mileage value of the aircraft and a predetermined production rating fuel mileage; and
   means for automatically adjusting a predetermined indicated airspeed based on the determined Mach trim value.

6. The system of claim 5, further comprising:
   means for sending the adjusted indicated airspeed to at least one of an autopilot system or one or more airspeed displays.

7. The system of claim 5, wherein the indicated airspeed is adjusted if the indicated airspeed is within a range of airspeeds.

8. The system of claim 7, wherein the range of airspeeds includes cruise airspeeds.

9. A method for adjusting indicated airspeed of an aircraft, the method comprising:
   determining actual fuel mileage for the aircraft;
   comparing the determined actual fuel mileage to a predefined production rating fuel mileage;
   setting a speed trim value based on the comparison; and
   adjusting indicated airspeed based on the determined speed trim value.

10. The method of claim 9, further comprising:
    sending the adjusted indicated airspeed to at least one of an autopilot system or one or more airspeed displays.

11. The method of claim 9, wherein determining actual fuel mileage is performed over a range of airspeeds.

12. The method of claim 9, wherein adjusting indicated airspeed adjusts the indicated airspeed if the indicated airspeed is within a range of airspeeds.

13. The method of claim 12, wherein the range of airspeeds includes cruise airspeeds.

14. A system for adjusting indicated airspeed of an aircraft, the system comprising:
    means for determining actual fuel mileage for the aircraft;
    means for comparing the determined actual fuel mileage to a predefined production rating fuel mileage;
    means for setting a speed trim value based on the comparison; and
    means for adjusting indicated airspeed based on the determined speed trim value.

15. The system of claim 14, further comprising:
    means for sending the adjusted indicated airspeed to at least one of an autopilot system or one or more airspeed displays.

16. The system of claim 14, wherein the actual fuel mileage is determined over a range of speeds.

17. The system of claim 14, wherein the indicated airspeed is adjusted if the indicated airspeed is within a range of airspeeds.

18. The system of claim 17, wherein the range of airspeeds includes cruise airspeeds.

19. A system for adjusting indicated airspeed of an aircraft, the system comprising:
    a flight data computer including:
      a first component for determining actual fuel mileage for the aircraft;
      a second component for comparing the determined actual fuel mileage to a production rating fuel mileage;
      a user interface for allowing a user to set a Mach trim value based on the comparison; and
      a third component for adjusting indicated airspeed based on the determined Mach trim value; and
    an autopilot for receiving the adjusted indicated airspeed.

20. The system of claim 19, wherein the first component determines actual fuel mileage over a range of speeds.

21. The system of claim 19, wherein the third component adjusts the indicated airspeed if the indicated airspeed is within a range of airspeeds.

22. The system of claim 21, wherein the range of airspeeds includes cruise airspeeds.

23. A system for adjusting indicated airspeed of an aircraft, the system comprising:
    a flight data computer including:
      a first component for determining actual fuel mileage for the aircraft;
      a second component for comparing the determined actual fuel mileage to a production rating fuel mileage;
      a user interface for allowing a user to set a Mach trim value based on the comparison; and
      a third component for adjusting indicated airspeed based on the determined Mach trim value; and
    one or more displays for receiving and presenting the adjusted indicated airspeed.

24. The system of claim 23, wherein the first component determines actual fuel mileage over a range of speeds.

25. The system of claim 23, wherein the third component adjusts the indicated airspeed if the indicated airspeed is within a range of airspeeds.

26. The system of claim 25, wherein the range of airspeeds includes cruise airspeeds.

27. A system for adjusting indicated airspeed of an aircraft, the system comprising:
    a flight data computer including:
      a user interface for allowing a user to set a Mach trim value based upon a comparison of an actual fuel mileage value of the aircraft and a predetermined production rating fuel mileage; and
      a component for automatically adjusting a predetermined indicated airspeed based on the determined Mach trim value; and
    an autopilot for receiving the adjusted indicated airspeed.

28. The system of claim 27, wherein the component adjusts the indicated airspeed if the indicated airspeed is within a range of airspeeds.

29. The system of claim 28, wherein the range of airspeeds includes cruise airspeeds.

30. A system for adjusting indicated airspeed of an aircraft, the system comprising:
    a flight data computer including:
      a user interface for allowing a user to set a Mach trim value based upon a comparison of an actual fuel mileage value of the aircraft and a predetermined production rating fuel mileage; and
      a component for automatically adjusting a predetermined indicated airspeed based on the determined Mach trim value; and
    one or more displays for receiving and presenting the adjusted indicated airspeed.

31. The system of claim 30, wherein the component adjusts the indicated airspeed if the indicated airspeed is within a range of airspeeds.

32. The system of claim 31, wherein the range of airspeeds includes cruise airspeeds.

* * * * *